United States Patent
Kobayashi et al.

(10) Patent No.: US 6,509,405 B1
(45) Date of Patent: Jan. 21, 2003

(54) MG-AL-BASED HYDROTALCITE-TYPE PARTICLES, CHLORINE-CONTAINING RESIN COMPOSITION AND PROCESS FOR PRODUCING THE PARTICLES

(75) Inventors: Naoya Kobayashi, Hiroshima (JP); Torayuki Honmyo, Otake (JP); Tsutomu Katamoto, Hatsukaichi (JP); Akinori Yamamoto, Hatsukaichi (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/495,309

(22) Filed: Feb. 1, 2000

(30) Foreign Application Priority Data

Feb. 5, 1999 (JP) ............................. 11-028998

(51) Int. Cl.$^7$ ................................ C08L 3/22
(52) U.S. Cl. ................ 524/436; 524/437; 524/445; 524/456
(58) Field of Search ................ 524/436, 437, 524/444, 456, 452

(56) References Cited

U.S. PATENT DOCUMENTS

| | | | | |
|---|---|---|---|---|
| 4,675,356 A | * | 6/1987 | Miyata | 524/424 |
| 4,761,188 A | * | 8/1988 | Miyata | 148/6.2 |
| 4,990,268 A | * | 2/1991 | Burba et al. | 252/8.514 |
| 5,106,898 A | * | 4/1992 | Nosu et al. | 524/313 |
| 5,114,898 A | * | 5/1992 | Pinnavaia et al. | 502/406 |
| 5,116,587 A | * | 5/1992 | Pinnavaia et al. | 423/244 |
| 5,629,251 A | * | 5/1997 | Miyata | 501/112 |
| 5,696,226 A | * | 12/1997 | Nosu et al. | 528/310 |

FOREIGN PATENT DOCUMENTS

| | | | |
|---|---|---|---|
| EP | 0 362 012 A1 | * 9/1989 | C08K/13/02 |
| EP | 0 709 427 A1 | * 5/1996 | C08K/9/02 |
| EP | 0 838 493 A1 | 4/1998 | |
| JP | 55080445 A | 6/1980 | |
| JP | 57080444 A | 5/1982 | |
| JP | 57147552 A | 9/1982 | |
| JP | 58122951 | 7/1983 | |
| JP | 08073687 A | 3/1996 | |

OTHER PUBLICATIONS

Miyata Clays and Clay Minerals, vol. 28, No. 1, 1980, pp 50–56 XP–002059020 Physico Chemical Properties of Synthetic Hydrotalcites in Relation to Composition.

* cited by examiner

*Primary Examiner*—David W. Wu
*Assistant Examiner*—Rip A Lee
(74) *Attorney, Agent, or Firm*—Nixon & Vanderhye P.C.

(57) ABSTRACT

A chlorine-containing resin composition for covering an electric wire of the present invention, has a heat stability of not less than 240 minutes and a volume resistivity of $5.0 \times 10^{13}$ to $1.0 \times 10^{16}$ Ω·cm when measured according to JIS K6723, and comprises:

100 parts by weight of a chlorine-containing resin, and 1.5 to 10 parts by weight of Mg—Al-based hydrotalcite-type particles having a composition represented by the formula:

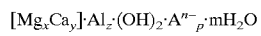

$$[Mg_xCa_y]\cdot Al_z\cdot(OH)_2\cdot A^{n-}{}_p\cdot mH_2O$$

wherein
$0.2 \leq z/(x+z) \leq 0.6$; $0.01 \leq y/(x+z) \leq 0.20$; $x+y+z=1$;
$p=(2(x+y-1)+3z)/n$; A is a n-valent anion; and m is more than 0 and not more than 0.75, having a plate surface diameter of 0.1 to 1.0 μm and a thickness of 0.02 to 0.08 μm, and containing calcium at a molar ratio of Ca to a sum of Mg and Al of 0.01:1 to 0.20:1, and having a heat-resisting time of not less than 4 hours upon a chlorine-containing resin composition containing the Mg—Al-based hydrotalcite-type particles.

3 Claims, No Drawings

MG-AL-BASED HYDROTALCITE-TYPE PARTICLES, CHLORINE-CONTAINING RESIN COMPOSITION AND PROCESS FOR PRODUCING THE PARTICLES

BACKGROUND OF THE INVENTION

The present invention relates to a chlorine-containing resin composition containing Mg—Al-based hydrotalcite-type particles, the Mg—Al-based hydrotalcite-type particles, and a process for producing the Mg—Al-based hydrotalcite-type particles. More particularly, the present invention relates to a chlorine-containing resin composition containing Mg—Al-based hydrotalcite-type particles having a large plate surface diameter and an adequate thickness, which is not only excellent in heat stability and heat discoloration resistance but also is improved in electrical insulating property; the Mg—Al-based hydrotalcite-type particles which are suitable as a stabilizer for chlorine-containing resins; and a process for producing such Mg—Al-based hydrotalcite-type particles.

As layered compounds, there are known various compounds as well as clay minerals or the like. Among these layered compounds, layered double hydroxides such as hydrotalcite have such a structure capable of inserting various anions or molecules into spacings between respective layers thereof and, therefore, can exhibit an anion-exchanging property.

In general, as described in Journal of the Chemical Society of Japan, 1995, No. 8, pp. 622 to 628, the hydrotalcite is represented by the formula:

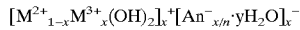

$$[M^{2+}_{1-x}M^{3+}_x(OH)_2]_x^+[An^-_{x/n} \cdot yH_2O]_x^-$$

wherein $M^{2+}$ is a divalent metal ion such as $Mg^{2+}$, $Co^{2+}$, $Ni^{2+}$ or $Zn^{2+}$; $M^{3+}$ is a trivalent metal ion such as $Al^{3+}$, $Fe^{3+}$ or $Cr^{3+}$; $An^-$ is an n-valent anion such as $OH^-$, $Cl^-$, $CO_3^{2-}$ or $SO_4^{2-}$; and x is usually 0.2 to 0.33, and such hydrotalcite has a laminated crystal structure which comprises two-dimensional main layers composed of regular octahedral brucite units each having a positive charge, and interlayers each having a negative charge.

The hydrotalcite has been used in various applications because of good anion-exchanging property thereof, for example, as ion exchange materials, adsorbents, deodorants or the like. Also, the hydrotalcite has been used in various other applications such as stabilizers for resins or rubbers, e.g., polyethylene, polypropylene and chlorine-containing resins (typically, vinyl chloride resins), as well as paints, various catalysts, agricultural films, inks or the like.

In recent years, as to catalysts or the like, it has been required to use those containing no harmful metals from the standpoint of environmental protection. The hydrotalcite-type particles have been expected to satisfy these requirements because the hydrotalcite-type particles have almost no toxicity and exhibit an excellent catalytic property or the like.

In particular, among these hydrotalcite-type particles, Mg—Al-based hydrotalcite-type particles containing $Mg^{2+}$ as a divalent metal ion and $Al^{3+}$ as a trivalent metal ion, are most noticeable owing to its good stability.

As the general production method of hydrotalcite, there is known a method of mixing an aqueous metal salt solution containing divalent metal ions and trivalent metal ions which constitute main layers thereof, with an aqueous carbonate solution containing carbonate ions which constitute interlayers thereof, and then subjecting the obtained mixture to coprecipitation reaction while controlling the temperature, the pH value and the like. In addition to the above method of conducting the reaction under ordinary pressure, there is also known a method of producing hydrotalcite under pressure by hydrothermal reaction using an autoclave.

Hitherto, hydrotalcite-type particles used for kneading into resins, have been required to possess a large plate surface diameter and an adequate thickness in the consideration of dispersibility in resins upon kneading. However, in order to obtain such hydrotalcite-type particles having a large plate surface diameter, it is necessary to use specific reaction conditions such as those for hydrothermal synthesis or the like.

Further, in the case where the hydrotalcite-type particles are used as a stabilizer for chlorine-containing resins or rubbers such as vinyl chloride resins or the like, it is also required that the particles are sufficiently dispersed in the resins or rubbers and have a high chlorine ion-capturing ability in order to obtain resin or rubber products having an excellent heat resistance.

More particularity, among the above-described various applications, the use of hydrotalcite-type particles as a stabilizer for chlorine-containing resins is more noticeable. Such chlorine-containing resins have been used in various applications because of good physical and chemical properties thereof. Especially, the chlorine-containing resins are more excellent in electrical insulating property, arc resistance, tracking resistance and voltage resistance as compared to polyolefins and, therefore, have been widely used as an electric wire-covering material.

However, the chlorine-containing resins are susceptible to heat deterioration and oxidation degradation and, therefore, suffer from deteriorated properties such as low elongation when used for a long period of time, thereby causing such a problem that the resins are no longer usable as an electric wire-covering material.

For this reason, as the stabilizer for chlorine-containing resins as an electric wire-covering material, there have been frequently used lead-based compounds such as tribasic lead sulfate, lead stearate or the like. However, it has been recently required to use those materials containing no toxic metal from the standpoint of environmental protection. Therefore, the use of hydrotalcite-type particles having substantially no toxicity and an excellent function as a stabilizer for chlorine-containing resins, has been proposed (Japanese Patent Application Laid-Open (KOKAI) Nos. 55-80445, 57-80444, 57-147552, 58-122951 and 8-73687 (1996)).

More specifically, in Japanese Patent Application Laid-Open (KOKAI) No. 8-73687(1996), it has been described that a halogen-containing resin composition comprising a halogen-containing resin, specific antioxdants, hydrotalcites and zinc compounds. The hydrotalcites used in Japanese Patent Application Laid-Open (KOKAI) No. 8-73687 (1996), is represented by the formula:

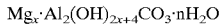

$$Mg_x \cdot Al_2(OH)_{2x+4}CO_3 \cdot nH_2O$$

wherein $4 \leq x \leq 6$, $0 \leq n \leq 20$. Further, as the hydrotalcites used in Examples of Japanese Patent Application Laid-Open (KOKAI) No. 8-73687(1996), there is cited $Mg_{4.5} \cdot Al_2(OH)_{13}CO_3 \cdot 3.5H_2O$ and $Mg_4 \cdot Al_2(OH)_{12}CO_3 \cdot 3H_2O$.

The chlorine-containing resin compositions used as an electric wire-covering material have been required to possess an excellent heat stability and a high electrical insulating property. Further, those resin compositions used as white- or light-colored electric wire-covering materials have been required to be free from heat discoloration upon processing, i.e., to show a good heat discoloration resistance. Further, in order to obtain chlorine-containing resin compositions capable of satisfying the above requirements, it is necessary that hydrotalcite-type particles used as a stabilizer have not only a large plate surface diameter and an adequate thickness but also a high chlorine ion-capturing ability.

At the present time, it has been strongly demanded to provide Mg—Al-based hydrotalcite-type particles which have a large plate surface diameter and an adequate thickness, and is suitable as a stabilizer for chlorine-containing resins. However, such Mg—Al-based hydrotalcite-type particles capable of satisfying the above properties have not been obtained yet.

In the conventional coprecipitation methods, it is not possible to obtain hydrotalcite-type particles having a large plate surface diameter. Under specific reaction conditions such as those of hydrothermal synthesis, although hydrotalcite-type particles having a large plate surface diameter can be produced, when such hydrotalcite-type particles are used as a stabilizer of chlorine-containing resins, a sufficient heat resistance can not be obtained.

Especially, it has been strongly demanded to provide a chlorine-containing resin composition which is excellent in heat stability and heat discoloration resistance and is improved in electrical insulating property. However, such a chlorine-containing resin composition capable of satisfying these requirements have not been obtained yet.

Thus, such conventional techniques described in the above prior publications, have failed to provide a sufficient stabilizing effect and, therefore, the heat stability, heat discoloration resistance and electrical insulating property of the conventional chlorine-containing resin compositions are insufficient.

As a result of the present inventors' earnest studies, it has been found that when by kneading in a chlorine-containing resin Mg—Al-based hydrotalcite-type particles having a plate surface diameter of 0.1 to 1.0 μm and a thickness of 0.02 to 0.08 μm, obtained by mixing an aqueous anion-containing alkali solution, an aqueous magnesium salt solution and an aqueous aluminum salt solution with each other, adding an aqueous calcium salt solution to the mixed solution such that the molar ratio of Ca to a sum of Mg and Al is 0.01:1 to 0.2:1, and aging the obtained solution at a temperature of 60 to 105° C. while controlling the pH value of the solution to 10 to 14, the obtained resin composition is considerably improved in heat stability, heat-discoloration resistance and electrical insulating property. The present invention has been attained on the basis of this finding.

SUMMARY OF THE INVENTION

It is an object of the present invention to provide a chlorine-containing resin composition which is not only excellent in heat stability and heat discoloration resistance but also shows a high electrical insulating property.

It is another object of the present invention to provide Mg—Al-based hydrotalcite-type particles which have a large plate surface diameter and an adequate thickness, and are suitable as a stabilizer for chlorine-containing resins or the like.

To accomplish the aim, in a first aspect of the present invention, there is provided a chlorine-containing resin composition for covering an electric wire, having a heat stability of not less than 240 minutes and a volume resistivity of $5.0 \times 10^{13}$ to $1.0 \times 10^{16}$ Ω·cm when measured according to JIS K6723, and comprising:

100 parts by weight of a chlorine-containing resin, and 1.5 to 10 parts by weight of Mg—Al-based hydrotalcite-type particles having a composition represented by the formula:

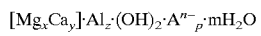

wherein $0.2 \leq z/(x+z) \leq 0.6$; $0.01 \leq y/(x+z) \leq 0.20$; $x+y+z=1$; $p=(2(x+y-1)+3z)/n$; A is a n-valent anion; and m is more than 0 and not more than 0.75, having a plate surface diameter of 0.1 to 1.0 μm and a thickness of 0.02 to 0.08 μm, and containing calcium at a molar ratio of Ca to a sum of Mg and Al of 0.01:1 to 0.20:1, and having a heat-resisting time of not less than 4 hours when measured by the following methods (1) to (3):

(1) After the hydrotalcite-type particles together with additives are mixed in a vinyl chloride resin at the following mixing ratio, 50 g of the obtained mixture is kneaded at 155° C. for 3 minutes using hot rolls whose gap is set to 0.75 mm, thereby obtaining a kneaded sheet.

Composition of mixture:

| | |
|---|---|
| Hydrotalcite-type particles | 3 parts by weight |
| Vinyl chloride resin (degree of polymerization: 1,300, tradename: TK-1,300, produced by Shin-Etsu Kagaku Kogyo Co., Ltd.) | 100 parts by weight |
| Diethylhexyl phthalate (DOP, produced by Dai-Hachi Kagaku Co., Ltd.) | 50 parts by weight |
| Calcium stearate | 2 parts by weight |
| Zinc stearate | 0.4 part by weight |
| 1,3-diphenyl-1,3-propane-dione | 0.2 part by weight |
| Diethyl phosphite | 0.5 part by weight |

(2) The obtained kneaded sheet is pressure-treated using a hot press, thereby producing a sheet piece having a thickness of 1.5 mm. The press conditions are as follows:

press temperature: 160° C.; press pressure: 100 kg/cm²; press time: 1 minute; press gap: 1.5 mm; and amount treated: 35 g.

(3) The obtained sheet piece (20 mm×20 mm) is placed in an oven so as to be allowed to stand in air at 180° C. The time required until the sheet piece is black-discolored is determined as a heat-resisting time.

In a second aspect of the present invention, there is provided an electric wire material having a heat stability of not less than 240 minutes and a volume resistivity of $5.0 \times 10^{13}$ to $1.0 \times 10^{16}$ Ω·cm when measured according to JIS K6723, and comprising the chlorine-containing resin composition comprising 1.5 to 10 parts by weight of Mg—Al-based hydrotalcite-type particles having a composition represented by the formula:

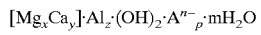

wherein $0.2 \leq z/(x+z) \leq 0.6$; $0.01 \leq y/(x+z) \leq 0.20$; $x+y+z=1$; $p=(2(x+y-1)+3z)/n$; A is a n-valent anion; and m is more than 0 and not more than 0.75, having a plate surface diameter of 0.1 to 1.0 μm and a thickness of 0.02 to 0.08 μm and containing calcium at a molar ratio of Ca to a sum of Mg and Al of 0.01:1 to 0.20:1, and exhibiting a heat-resisting time of not less than 4 hours upon a chlorine-containing resin composition containing the Mg—Al-based hydrotalcite-type particles; and 100 parts by weight of a chlorine-containing resin.

In a third aspect of the present invention, there are provided Mg—Al-based hydrotalcite-type particles having a composition represented by the formula:

$$[Mg_xCa_y] \cdot Al_z \cdot (OH)_2 \cdot A^{n-}{}_p \cdot mH_2O$$

wherein $0.2 \leq z/(x+z) \leq 0.6$; $0.01 \leq y/(x+z) \leq 0.20$; $x+y+z=1$; $p=(2(x+y-1)+3z)/n$; A is a n-valent anion; and m is more than 0 and not more than 0.75, having a plate surface diameter of 0.1 to 1.0 μm and a thickness of 0.02 to 0.08 μm and containing calcium at a molar ratio of Ca to a sum of Mg and Al of 0.01:1 to 0.20:1, and having a heat-resisting time of not less than 4 hours when measured by the following methods (1) to (3):

(1) After the hydrotalcite-type particles together with additives are mixed in a vinyl chloride resin at the following mixing ratio, 50 g of the obtained mixture is kneaded at 155° C. for 3 minutes using hot rolls whose gap is set to 0.75 mm, thereby obtaining a kneaded sheet.

Composition of mixture:

| | |
|---|---|
| Hydrotalcite-type particles | 3 parts by weight |
| Vinyl chloride resin (degree of polymerization: 1,300, tradename: TK-1,300, produced by Shin-Etsu Kagaku Kogyo Co., Ltd.) | 100 parts by weight |
| Diethylhexyl phthalate (DOP, produced by Dai-Hachi Kagaku Co., Ltd.) | 50 parts by weight |
| Calcium stearate | 2 parts by weight |
| Zinc stearate | 0.4 part by weight |
| 1,3-diphenyl-1,3-propane-dione | 0.2 part by weight |
| Diethyl phosphite | 0.5 part by weight |

(2) The obtained kneaded sheet is pressure-treated using a hot press, thereby producing a sheet piece having a thickness of 1.5 mm. The press conditions are as follows:

press temperature: 160° C.; press pressure: 100 kg/cm²; press time: 1 minute; press gap: 1.5 mm; and amount treated: 35 g.

(3) The obtained sheet piece (20 mm×20 mm) is placed in an oven so as to be allowed to stand in air at 180° C. The time required until the sheet piece is black-discolored is determined as a heat-resisting time.

In a fourth aspect of the present invention, there is provided a stabilizer for chlorine-containing resins, comprising Mg—Al-based hydrotalcite-type particles having a composition represented by the formula:

$$[Mg_xCa_y] \cdot Al_z \cdot (OH)_2 \cdot A^{n-}{}_p \cdot mH_2O$$

wherein $0.2 \leq z/(x+z) \leq 0.6$; $0.01 \leq y/(x+z) \leq 0.20$; $x+y+z=1$; $p=(2(x+y-1)+3z)/n$; A is a n-valent anion; and m is more than 0 and not more than 0.75, having a plate surface diameter of 0.1 to 1.0 μm and a thickness of 0.02 to 0.08 μm and containing calcium at a molar ratio of Ca to a sum of Mg and Al of 0.01:1 to 0.20:1, and exhibiting a heat-resisting time of not less than 4 hours upon a chlorine-containing resin composition containing the Mg—Al-based hydrotalcite-type particles.

In a fifth aspect of the present invention, there is provided a process for producing the Mg—Al-based hydrotalcite-type particles, comprising:

mixing an anion-containing alkali solution, an aqueous magnesium salt solution and an aqueous aluminum salt solution with each other;

adding an aqueous calcium solution to the mixed solution such that the molar ratio of Ca to a sum of Mg and Al is 0.01:1 to 0.20:1; and aging the obtained solution at a temperature of 60 to 105° C. while controlling the pH value of the solution to 10 to 14.

DETAILED DESCRIPTION OF THE INVENTION

The present invention is described in detail below.

First, Mg—Al-based hydrotalcite-type particles according to the present invention are explained.

The Mg—Al-based hydrotalcite-type particles according to the present invention are of a plate-like shape, and have a plate surface diameter of usually 0.1 to 1.0 μm and a thickness of usually 0.02 to 0.08 μm.

When the plate surface diameter of the Mg—Al-based hydrotalcite-type particles is less than 0.1 μm, the particles are insufficient in dispersibility in resins when kneaded thereinto. Also, it is difficult to industrially produce such Mg—Al-based hydrotalcite-type particles having the plate surface diameter is more than 1.0 μm. The plate surface diameter of the Mg—Al-based hydrotalcite-type particles according to the present invention is preferably 0.2 to 0.8 μm.

When the thickness of the Mg—Al-based hydrotalcite-type particles is less than 0.02 μm, the Mg—Al-based hydrotalcite-type particles are insufficient in dispersibility in resins when kneaded thereinto. Also, it is difficult to industrially produce such Mg—Al-based hydrotalcite-type particles having the thickness is more than 0.08 μm. The thickness of the Mg—Al-based hydrotalcite-type particles according to the present invention is preferably 0.025 to 0.075 μm.

In the Mg—Al-based hydrotalcite-type particles according to the present invention, the molar ratio of Ca to a sum of Mg and Al is usually 0.01:1 to 0.20:1, preferably 0.03:1 to 0.15:1.

When the molar ratio of Ca to a sum of Mg and Al in the Mg—Al-based hydrotalcite-type particles is less than 0.01:1 or more than 0.20:1, it is difficult to obtain particles having a sufficiently large plate surface diameter.

When a resin sheet prepared by using a chlorine-containing resin composition obtained by mixing 3 parts by weight of the Mg—Al-based hydrotalcite-type particles according to the present invention with 100 parts by weight of a vinyl chloride resin, is heated at 180° C., the resin sheet can withstand the heating condition for not less than 4 hours (the time is hereinafter referred to as "heat-resisting time").

When the heat-resisting time is less than 4 hours, the chlorine-containing resin composition containing the Mg—Al-based hydrotalcite-type particles, is deteriorated. The longer the heat-resisting time, the higher the chlorine ion-capturing ability of the Mg—Al-based hydrotalcite-type particles, which is capable of effectively capturing harmful hydrogen chloride generated by the heat, light or oxygen decomposition of the chlorine-containing resin, so that the deterioration in quality and properties of the chlorine-containing resin is suppressed. The heat-resisting time of such a resin is preferably not less than 5 hours. The upper limit of the heat-resisting time of the resin is preferably 8 hours.

The Mg—Al-based hydrotalcite-type particles according to the present invention are represented by the following composition formula:

$$[Mg_xCa_y] \cdot Al_z \cdot (OH)_2 \cdot A^{n-}{}_p \cdot mH_2O$$

wherein $0.2 \leq z/(x+z) \leq 0.6$; $0.01 \leq y/(x+z) \leq 0.20$; $x+y+z=1$; $p=(2(x+y-1)+3z)/n$; A is an n-valent anion; and m is more than 0 and not more than 0.75.

With respect to Mg and Al contents of the Mg—Al-based hydrotalcite-type particles according to the present invention, the ratio: $z/(x+z)$ wherein x is Mg and z is Al, is 0.2:1 to 0.6:1. When the ratio: $z/(x+z)$ is less than 0.2:1 or more than 0.6:1 (i.e., when the ratio of Mg to Al is less than 4:1 or more than 2:3), it may become difficult to obtain single-phase hydrotalcite-type particles. The ratio: $z/(x+z)$ is preferably in the range of 0.2:1 to 0.56:1.

The sum of x, y and z is 1 ($x+y+z=1$).

The anion ($A^{n-}$) contained in the Mg—Al-based hydrotalcite-type particles according to the present invention may be selected from the group consisting of a hydroxy ion ($OH^-$), a carbonate ion ($CO_3^{2-}$) and a sulfate ion ($SO_4^{2-}$). Among these anions, the carbonate ion is preferred.

The plate ratio (plate surface diameter/thickness) of the Mg—Al-based hydrotalcite-type particles according to the present invention is preferably 2:1 to 15:1, more preferably 2:1 to 13:1, and the BET specific surface area value thereof is preferably 8 to 90 m$^2$/g, more preferably 8 to 70 m$^2$/g.

Next, the process for producing the Mg—Al-based hydrotalcite-type particles according to the present invention, is described.

The Mg—Al-based hydrotalcite-type particles according to the present invention is produced by mixing an anion-containing alkali solution, an aqueous magnesium salt solution and an aqueous aluminum salt solution with each other; adding an aqueous calcium solution to the mixed solution; and aging the obtained solution at a temperature of 60 to 105° C. for 2 to 24 hours while controlling the pH value of the solution to 10 to 14.

In the present invention, as the aqueous anion-containing alkali solution, there may be suitably used a mixed alkali solution composed of an aqueous anion-containing solution such as sodium carbonate, sodium hydrogencarbonate, potassium carbonate, potassium hydrogencarbonate or the like, and an aqueous alkali hydroxide solution such as sodium hydroxide, potassium hydroxide or the like.

As the aqueous anion-containing solution, the use of an aqueous sodium carbonate solution is preferred.

As the aqueous alkali hydroxide solution, the use of an aqueous sodium hydroxide solution is preferred.

In the present invention, as the aqueous magnesium salt solution, there may be used an aqueous magnesium sulfate solution, an aqueous magnesium chloride solution, an aqueous magnesium nitrate solution or the like. Among these aqueous magnesium salt solutions, the aqueous magnesium sulfate solution and the aqueous magnesium chloride solution are preferred.

In the present invention, as the aqueous aluminum salt solution, there may be used an aqueous aluminum sulfate solution, an aqueous aluminum chloride solution, an aqueous aluminum nitrate solution or the like. Among these aqueous aluminum salt solutions, the aqueous aluminum sulfate solution and the aqueous aluminum chloride solution are preferred.

The order of mixing or addition of the aqueous anion-containing solution, the aqueous magnesium salt solution and the aqueous aluminum salt solution is not particularly restricted. All of the aqueous solutions may be mixed together at the same time. Preferably, a mixed solution composed of the aqueous magnesium salt solution and the aqueous aluminum salt solution is added to the aqueous anion-containing solution.

Further, the addition of each aqueous solution may be carried out by adding the whole part thereof at once, by adding the solution in two or more separate parts or by continuously dropping the solution.

In the present invention, the aqueous calcium salt solution is added to the mixed solution composed of the aqueous anion-containing solution, the aqueous magnesium salt solution and the aqueous aluminum salt solution.

As the aqueous calcium salt solution, there may be used an aqueous calcium chloride solution, an aqueous calcium nitrate solution or the like. Among these aqueous calcium salt solutions, the use of the aqueous calcium chloride solution is preferred.

The aqueous calcium salt solution may be added in such an amount that the molar ratio of Ca to a sum of Mg and Al is usually 0.01:1 to 0.20:1, preferably 0.03:1 to 0.15:1.

In the reaction solution prepared by mixing the aqueous anion-containing solution, the aqueous magnesium salt solution, the aqueous aluminum salt solution and the aqueous calcium salt solution together, the concentration of the magnesium salt is preferably 0.1 to 1.5 mol/liter, more preferably 0.1 to 1.2 mol/liter; the concentration of the aluminum salt is preferably 0.03 to 1.0 mol/liter, more preferably 0.04 to 0.8 mol/liter; the concentration of the calcium salt is preferably 0.01 to 0.2 mol/liter, more preferably 0.01 to 0.15 mol/liter; the concentration of the anion is preferably 0.05 to 1.4 mol/liter, more preferably 0.06 to 1.2 mol/liter; and the concentration of the alkali hydroxide is preferably 0.5 to 8 mol/liter, more preferably 0.8 to 6 mol/liter.

In the reaction solution, the molar ratio of $CO_3$ to Al is preferably 0.5 to 2.0, more preferably 0.5 to 1.5.

The temperature used for the aging reaction of the present invention is usually 60 to 105° C., preferably 80 to 105° C. When the aging temperature is less than 60° C., it is difficult to produce the hydrotalcite-type particles having a large plate surface diameter. When the aging temperature is more than 105° C., it is necessary to use a pressure vessel such as autoclave in the aging reaction, resulting in uneconomical process.

In the present invention, during the aging reaction, the pH value of the reaction solution is adjusted to usually 10 to 14, preferably 11 to 14. When the pH value is less than 10, it is difficult to obtain hydrotalcite-type particles having a large plate surface diameter and an adequate thickness.

The aging time of the present invention is preferably 2 to 24 hours. When the aging time is less than 2 hours, it is difficult to obtain hydrotalcite-type particles having a large plate surface diameter and an adequate thickness. When the aging time is more than 24 hours, the process becomes uneconomical.

After completion of the aging reaction, the obtained particles are washed with water by ordinary methods and then dried, thereby producing Mg—Al-based hydrotalcite-type particles according to the present invention.

Next, the chlorine-containing resin composition according to the present invention is described.

The heat stability of the chlorine-containing resin composition is usually not less than 240 minutes, preferably not less than 350 minutes, more preferably not less than 400 minutes, still more preferably not less than 420, most preferably not less than 460 minutes when measured according to JIS K6723. When the heat stability is less than 240 minutes, the chlorine-containing resin composition is unsuitable for covering electric wires. The more excellent the heat stability, the more the chlorine-containing resin become to be hardly decomposed. The upper limit of the heat stability of the chlorine-containing resin composition is preferably 1,000 minutes.

As to the electrical insulating property of the chlorine-containing resin composition according to the present invention, the volume resistivity of the resin composition is usually $5.0 \times 10^{13}$ to $1.0 \times 10^{16}$ Ω·cm, preferably $8.0 \times 10^{13}$ to $1.0 \times 10^{14}$ Ω·cm when measured according to JIS K6723. When the volume resistivity is less than $5.0 \times 10^{13}$ Ω·cm, the chlorine-containing resin composition is unsuitable for covering electric wires.

The chlorine-containing resin composition according to the present invention contains the above Mg—Al-based hydrotalcite-type particles of 1.5 to 10 parts by weight based on 100 parts by weight of the chlorine-containing resin and a plasticizer of 30 to 90 parts by weight based on 100 parts of the chlorine-containing resin, and may further contain other stabilizers and additives.

Meanwhile, as the hydrotalcite-type particles, there may be used Mg—Al-based hydrotalcite-type particles surface-coated with hydroxides and/or oxides of silicon, rosins, organic silane compounds, higher fatty acids or the like. Such surface-coated hydrotalcite-type particles are more improved in dispersibility in the chlorine-containing resin.

The coating amount of the hydroxides and/or oxides of silicon is usually not more than 50.0% by weight, preferably 0.05 to 50.0% by weight, more preferably 0.05 to 45.0% by weight (calculated as $SiO_2$) based on the weight of the Mg—Al-based hydrotalcite-type particles to be surface-coated.

The coating amount of the rosins is usually not more than 25.0% by weight, preferably 0.2 to 25.0% by weight (calculated as C) based on the weight of the Mg—Al-based hydrotalcite-type particles to be surface-coated.

The coating amount of the organic silane compounds is usually not more than 18.0% by weight, preferably 0.2 to 18.0% by weight (calculated as C) based on the weight of the Mg—Al-based hydrotalcite-type particles to be surface-coated.

The coating amount of the higher fatty acids is usually not more than 20.0% by weight, preferably 0.2 to 20.0% by weight (calculated as C) based on the weight of the Mg—Al-based hydrotalcite-type particles to be surface-coated.

As the chlorine-containing resin, there may be exemplified polyvinyl chloride, copolymers containing vinyl chloride as a main component, chlorinated polyethylene, polyvinylidene chloride, chlorinated polypropylene, chlorinated polyvinyl chloride or mixtures thereof. Among them, polyvinyl chloride is preferred. The degree of polymerization of polyvinyl chloride is preferably 1,000 to 1,500.

When the content of the hydrotalcite-type particles is less than 1.5 parts by weight based on 100 parts of the chlorine-containing resin, the particles cannot exhibit a sufficient effect as a stabilizer. When the content of the hydrotalcite-type particles is more than 10 parts by weight, no further stabilizing effect is obtained since the effect is already saturated. In addition, if a too large amount of the hydrotalcite-type particles is added, the chlorine-containing resin composition tends to undergo foaming, thereby sometimes adversely affecting an electrical insulating property and other necessary properties thereof. The content of the hydrotalcite-type particles is preferably 1.5 to 10 parts by weight, more preferably 1.5 to 8 parts by weight, still more preferably 1.5 to 6 parts by weight based on 100 parts of the chlorine-containing resin.

As the plasticizer, trimellitic acid esters, phthalic acid esters, polyesters or the like may be exemplified.

As the trimellitic acid esters, there may be exemplified trioctyltrimertate, tri-n-octyl-n-decyltrimeritate or the like.

As the phthalic acid esters, there may be exemplified diisononyl phthalate, di-2-ethylhexyl phthalate, dinonyl phthalate or the like.

As the polyesters, there may be exemplified polypropylene adipate, polypropylene sebacate or the like.

When the content of the plasticizer is less than 30 parts by weight based on 100 parts of the chlorine-containing resin, it is difficult to obtain a resin composition having a flexibility required for covering electric wires. When the content of the plasticizer is more than 90 parts by weight, no further flexibility-imparting effect is obtained since the effect is already saturated.

Examples of the other stabilizers may include zinc compounds, β-diketones, phosphites, polyvalent alcohol-based compounds, higher fatty acids, epoxy-based compounds or the like. Among these stabilizers, in the consideration of synergistic effect with the hydrotalcite-type particles, zinc compounds are preferred. The amount of the other stabilizers is preferably not more than 20 parts by weight based on 100 parts by weight of the chlorine-containing resin.

As the zinc compounds, there may be used zinc stearate, zinc laurate, zinc ricinoleate or the like. Among them, zinc stearate is preferred.

The amount of the zinc compound added is preferably 0.2 to 2.5 parts by weight, more preferably 0.5 to 2.2 parts by weight based on 100 parts by weight of the chlorine-containing resin.

As the β-diketones, there may be exemplified dibenzoyl methane, stearoyl benzoyl methane, dehydroacetic acid or the like.

As the phosphites, there may be exemplified alkylallyl phosphites, trialkyl phosphites or the like.

As the polyvalent alcohol-based compounds, there may be exemplified dipentaerythritol, pentaerythritol, glycerol, diglycerol, trimethylol propane or the like.

As the higher fatty acids, there may be exemplified stearic acid, lauric acid, oleic acid or the like. Among these higher fatty acids, stearic acid is preferred.

As the epoxy-based compounds, there may be exemplified epoxidated linseed oil, epoxidated soybean oil or the like.

Examples of the other additives may include antioxidants, electric resistance-increasing agents, gelling accelerators, extenders, flame retardants, lubricants, mildew proofing agents or the like. The amount of the other additives is preferably not more than 40 parts by weight based on 100 parts by weight of the chlorine-containing resin.

As the anitioxidants, there may be exemplified phenol-based compounds, amine-based compounds, phosphate-based compounds or the like.

As the phenol-based compounds, there may be exemplified 2,6-di-tertiary butyl-paracresol, 2,4,6-tri-tertiary butylphenol, styrenated phenol or the like.

As the amine-based compounds, there may be exemplified phenyl-β-naphthylamine, N,N'-diphenyl-p-phenylenediamine or the like.

As the phosphate-based compounds, there may be exemplified triphenyl phosphite, diphenyl decyl phosphite, phenyl isodecyl phosphite or the like.

As the electric resistance-increasing agents, there may be exemplified clay, mica, aluminum oxide, barium titanate or the like.

As the gelling accelerators, there may be exemplified polyesters wherein OH groups are introduced into the terminal, acrylonitrile-styrene copolymers, methylmethacrylate-styrene copolymers or the like.

As the extenders, there may be exemplified calcium carbonate, silica, glass beads, mica, glass fibers or the like.

As the flame retardants, there may be exemplified inorganic flame retardants such as antimony trioxide, aluminum hydroxide or zinc borate, bromine-containing organic flame retardants, halogen-containing phosphate-based flame retardants or the like.

As the lubricants, there may be exemplified calcium stearate, magnesium stearate, barium stearate or the like.

As the mildewproofing agents, there may be exemplified 2,4,4'-trichloro-2'-hydroxydiphenyl-ether, N-(trichloromethyl-thio)-4-cyclohexel,2-dicarboxiamide, 2-(4-thiazolyl)-benzimidazol or the like.

If coloring of the chlorine-containing resin composition is required, the resin composition may further contain pigments.

The process for producing the chlorine-containing resin composition according to the present invention is described below.

The chlorine-containing resin composition according to the present invention can be produced by ordinary methods. For example, in the case where the resin composition is produced in the form of a kneaded sheet for covering electric wires, the chlorine-containing resin, the hydrotalcite-type particles and the above-described various stabilizers or additives are mixed with each other at a predetermined mixing ratio, and the resultant mixture is kneaded together using hot rolls at a temperature of preferably 145 to 180° C. The kneaded material is then pressure-treated using a hot press at a temperature of preferably 150 to 190° C. to obtain a sheet.

The point of the present invention is that Mg—Al-based hydrotalcite-type particles having a large plate surface diameter and an adequate thickness is produced under ordinary pressure by adding a specific amount of the aqueous calcium salt solution and subjecting to coprecipitation reaction.

The reason why the Mg—Al-based hydrotalcite-type particles having a large plate surface is obtained, is not clearly known yet. However, it is considered as follows. That is, when the aqueous calcium salt solution is added, calcium ions having a large ion radius are incorporated into a network of Mg—Al layers (brucite layers), so that the distortion of the crystal structure due to aluminum having a small ion radius is eliminated, thereby accelerating the crystal growth.

The reason why the heat resistance of the chlorine-containing resin or the like is enhanced by kneading the Mg—Al-based hydrotalcite-type particles according to the present invention, is considered as follows. That is, since calcium is incorporated into the brucite layers, the hydrotalcite-type particles can be further enhanced in chlorine ion-capturing ability. Due to the fact that unstable chlorine ions in the chlorine-containing resin are more effectively captured by the hydrotalcite-type particles, the resin is improved in stability and, therefore, show a higher heat resistance.

Another point of the present invention is that the chlorine-containing resin composition according to the present invention is excellent in heat stability and electric insulating property for covering electric wires.

The reason why the chlorine-containing resin composition according to the present invention is excellent in heat stability, is considered as follows. That is, since the Mg—Al-based hydrotalcite-type particles according to the present invention has a high chlorine-capturing ability, the chlorine-containing resin composition containing the hydrotalcite-type particles show a high heat stability.

Also, the Mg—Al-based hydrotalcite-type particles according to the present invention has the effect of preventing zinc from being burnt (zinc-burning). Therefore, it is possible to blend a large amount of zinc compounds in the chlorine-containing resin composition. Since the zinc compounds such as zinc stearate not only effectively enhance a heat stability but also are inexpensive, it is advantageous to add a large amount of these zinc compounds into the resin composition. In addition, the zinc compounds show a synergistic effect of improving a heat discoloration resistance when used together with barium salts or calcium salts.

The reason why the chlorine-containing resin composition according to the present invention exhibits an excellent electric insulating property, is not clearly known yet. However, it is considered as follows. That is, since the Mg—Al-based hydrotalcite-type particles according to the present invention has a high anion-exchanging property, anions as decomposed products discharged from the chlorine-containing resin composition which act as carriers for electric charges, are absorbed in the particles, thereby enhancing an electric resistance of the resin composition.

As described above, since the Mg—Al-based hydrotalcite-type particles according to the present invention exhibit a large plate surface diameter and an adequate thickness, when the hydrotalcite-type particles are kneaded into a chlorine-containing resin, the obtained resin composition shows an excellent heat resistance. Therefore, the Mg—Al-based hydrotalcite-type particles according to the present invention are suitable as a stabilizer for chlorine-containing resins.

Further, the chlorine-containing resin composition according to the present invention is excellent not only in heat stability and heat discoloration resistance but also in electric insulating property. Therefore, the resin composition according to the present invention is suitable for covering electric wires.

EXAMPLES

The present invention is described in more detail by Examples and Comparative Examples, but the Examples are only illustrative and, therefore, not intended to limit the scope of the present invention.

Various properties were evaluated by the following methods.

(1) The plate surface diameter of hydrotalcite-type particles is expressed by the average of values measured from an electron micrograph.

(2) The thickness of hydrotalcite-type particles is expressed by the value calculated from the diffraction peak curve of (003) crystal plane of the hydrotalcite-type particles according to Scherrer's formula by using an X-ray diffractometer RAD-2A (manufactured by Rigaku Denki Co., Ltd.; type of X-ray tube: Fe, tube voltage: 40 kV; tube current: 20 mA; goniometer: wide-angle goniometer, sampling width: 0.010°, scanning speed: 0.5°/min., light-emitting slit: 1°, scattering slit: 1°, light-receiving slit: 0.30 mm).

(3) The identification of hydrotalcite-type particles is conducted by X-ray diffraction method using the above X-ray diffractometer, and the measurement is carried out at an diffraction angle (2θ) of 5 to 90°.

(4) The respective indices x, y and z of the composition formula: $[Mg_xCa_y] \cdot Al_z \cdot (OH)_2 \cdot A^{n-}{}_p \cdot mH_2O$ of Mg—Al-based hydrotalcite-type particles are determined by dissolving the particles in acid and measuring amounts of respective elements by using an inductively coupled plasma atomic emission spectroscope SPS4000 (manufactured by Seiko Denshi Kogyo Co., Ltd.).

(5) The silicon content (% by weight (calculated as $SiO_2$)) of the hydrotalcite-type particles surface-coated with hydroxides or oxides of silicon, is measured by X-ray fluorescence spectroscopy.

(6) The carbon content (wt. %) when using $CO_3^{2-}$ as an anion ($A^{n-}$) is measured by a Carbon-Sulfur Analyzer EMIA-2200 (manufactured by Horiba Co., Ltd.).

(7) The heat-resisting time of a vinyl chloride resin containing Mg—Al-based hydrotalcite-type particles is measured by the following method.

(i) After the hydrotalcite-type particles together with additives are mixed in a vinyl chloride resin at the following mixing ratio, 50 g of the obtained mixture is kneaded at 155° C. for 3 minutes using hot rolls whose gap is set to 0.75 mm, thereby obtaining a kneaded sheet.

Composition of mixture:

| | |
|---|---|
| Hydrotalcite-type particles | 3 parts by weight |
| Vinyl chloride resin (degree of polymerization: 1,300, tradename: TK-1,300, produced by Shin-Etsu Kagaku Kogyo Co., Ltd.) | 100 parts by weight |
| Diethylhexyl phthalate (DOP, produced by Dai-Hachi Kagaku Co., Ltd.) | 50 parts by weight |
| Calcium stearate (extra pure reagent) | 2 parts by weight |
| Zinc stearate (extra pure reagent) | 0.4 part by weight |
| 1,3-diphenyl-1,3-propane-dione (extra pure reagent) | 0.2 part by weight |
| Diethyl phosphite (extra pure reagent) | 0.5 part by weight |

(ii) The obtained kneaded sheet is pressure-treated using a hot press, thereby producing a sheet piece having a thickness of 1.5 mm. The press conditions are as follows:
press temperature: 160° C.; press pressure: 100 kg/cm²; press time: 1 minute; press gap: 1.5 mm; and amount treated: 35 g.

(iii) The obtained sheet piece (20 mm×20 mm) is placed in an oven so as to be allowed to stand in air at 180° C., thereby conducing a heat test. The time required until the sheet piece is black-discolored is determined as a heat-resisting time.

(8) The heat stability of a chlorine-containing resin composition is measured according to JIS K6723 with respect to a 1 mm-thick sheet produced by the above method using hot roll and hot press both heated to 160° C.

(9) The electric insulating property of the chlorine-containing resin composition is evaluated by measuring a volume resistivity of the above sheet according to JIS K6723.

(10) The heat discoloration resistance of the chlorine-containing resin composition is evaluated by visually observing the color tone of the above sheet and classifying the observation results into the following four ranks.

A: excellent (no change of color)
B: good (slight change of color)
C: poor (change to yellowish brown color)
D: bad (Change to brown~black color)

Example 1

<Production of Mg—Al-based Hydrotalcite-type Particles>

500 milliliters of an aqueous sodium carbonate solution having a $CO_3^{2-}$ ion concentration of 0.875 mol/liter was mixed with 3 liters of an aqueous sodium hydroxide solution having a NaOH concentration of 5.308 mol/liter. The resultant mixed solution was stirred at 60° C. in a reactor. Thereafter, the solution was added to a mixed solution of 500 ml of an aqueous 3.75 mol/l magnesium sulfate solution and 500 ml of an aqueous 0.625 mol/l aluminum sulfate solution and then mixed with 200 ml of an aqueous 0.75 mol/l calcium chloride solution, thereby obtaining a reaction solution having a total volume of 5 liters. The obtained solution in the reactor was aged at 95° C. for 18 hours while stirring and controlling the pH value to 12.5, thereby obtaining a white precipitate. The obtained white precipitate was filtered out, washed with water and then dried at 60° C. The obtained white particles were analyzed for identification thereof, and confirmed to be hydrotalcite-type particles.

The obtained Mg—Al-based hydrotalcite-type particles had an average plate surface diameter of 0.40 μm, a thickness of 0.0605 μm and a BET specific surface area of 11.6 m²/g. The composition of the obtained Mg—Al-based hydrotalcite-type particles was:

$[Mg_{0.709}Ca_{0.055}] \cdot Al_{0.236} \cdot (OH)_2 \cdot (CO_3^{2-})_{0.118} \cdot 0.501 H_2O$.

When the sheet piece prepared by using the obtained Mg—Al-based hydrotalcite-type particles was heated at 180° C., the heat-resisting time thereof was determined to be 6 hours.

Examples 2 to 8 and Comparative Examples 1 to 7

The same procedure as defined in Example 1 was conducted except that kind and concentration of magnesium compound, kind and concentration of aluminum compound, concentration of sodium carbonate, concentration of aqueous alkali solution, amount and concentration of calcium salt added, time of addition of calcium salt and aging temperature were changed variously, thereby producing Mg—Al-based hydrotalcite-type particles. In Comparative Example 7, the Mg—Al-based hydrotalcite particles were produced using an autoclave.

The production conditions are shown in Table 1, and properties of the obtained Mg—Al-based hydrotalcite-type particles are shown in Table 2.

Example 9

1.5 liters of a suspension containing the same Mg—Al-based hydrotalcite particles as obtained in Example 1 (concentration: 56.7 g/liter) was heated to 70° C., and 8.9 g of water glass #3 was gradually added to the suspension. After completion of the addition, the obtained mixture was aged for 60 minutes. The aged mixture was filtered out, washed with water, dried and then pulverized, thereby obtaining Mg—Al-based hydrotalcite-type particles surface-coated with hydroxides of silicon.

500 g of the obtained coated hydrotalcite-type particles and 15 g of natural rosin were charged into a Henschel mixer, and mixed therein for 5 minutes, thereby obtaining Mg—Al-based hydrotalcite-type particles successively surface-coated with hydroxides of silicon and further with the natural rosin.

Example 10

The Mg—Al-based hydrotalcite-type particles surface-coated with hydroxides of silicon were produced under the same conditions as defined in Example 9. 500 g of the obtained coated Mg—Al-based hydrotalcite-type particles and 2.5 g of decyltrimethoxy silane were charged into a Henschel mixer, and mixed therein for 5 minutes, thereby obtaining Mg—Al-based hydrotalcite-type particles successively surface-coated with hydroxides of silicon and further with decyltrimethoxy silane.

Examples 11 to 15 and Comparative Examples 8 to 11

The same procedures as defined in Examples 9 and 10 were conducted except that kind and amount of surface-treating agents added were changed variously, thereby producing Mg—Al-based hydrotalcite particles surface-coated with various surface-treating agents. In Comparative Example 11, the Mg—Al-based hydrotalcite-type particles were produced using an autoclave.

The particles obtained in Comparative Example 12 were commercially available Mg—Al-based hydrotalcite-type particles having a plate surface diameter of 0.25 μm, a thickness of 0.0610 μm, a plate ratio of 4.1 and a specific surface area of 9.2 $m^2$/g ALCAMIZER-1 (tradename) ($Mg_4 \cdot Al_2(OH)_{12}CO_3 \cdot 3H_2O$) produced by Kyowa Kagaku Kogyo Co., Ltd.) (used in Example 5 of Japanese Patent Application Laid-Open (KOKAI) No. 8-73687(1996)).

The production conditions are shown in Table 3, and properties of the obtained Mg—Al-based hydrotalcite particles are shown in Table 4.

Example 16

The hydrotalcite-type particles obtained in Example 1 and additives were mixed with a vinyl chloride resin at the mixing ratio as shown below. 50 g of the resultant mixture was kneaded together at 160° C. for 3 minutes using a hot roll whose gap was set to 0.75 mm, thereby obtaining a kneaded sheet.

| Composition kneaded: | |
|---|---|
| Hydrotalcite-type particles | 4.6 parts by weight |
| Vinyl chloride resin (Degree of polymerization: 1,300, tradename: Kanebeer, produced by Kanegafuchi Kagaku Co., Ltd.) | 100 parts by weight |
| Trioctyl trimelitate | 48 parts by weight |
| Zinc stearate (extra pure reagent) | 0.8 part by weight |
| Stearic acid (extra pure reagent) | 0.4 part by weight |
| Dibenzoylmethane | 0.2 part by weight |
| Dipentaerythritol | 0.2 part by weight |
| Calcium stearate (extra pure reagent) | 0.1 parts by weight |
| Diethyl phosphite (extra pure reagent) (anitioxidants) | 0.5 part by weight |
| Calcium carbonate (extra pure reagent) | 16 parts by weight |
| Antimony trioxide (extra pure reagent) | 5 parts by weight |
| Acrylonitrile-styrene copolymer (gelling accelerators) | 2 parts by weight |

The thus obtained kneaded sheet was pressure-treated using a hot press, thereby preparing a sheet piece having a thickness of 1.5 mm. The press conditions were as follows:

press temperature: 160° C.; press pressure: 100 kg/$cm^2$; press time: 1 minute; press gap: 1.0 mm; and amount treated: 35 g.

The heat stability of the obtained sheet piece was 511 minutes. The rank of the heat discoloration resistance thereof was "A". The electric insulating property thereof was 12.8×$10^{13}$ Ω·cm.

Examples 17 to 27 and Comparative Examples 13 to 19

The same procedures as defined in Example 16 were conducted except that the Mg—Al-based hydrotalcite-type particles obtained in Examples 1 and 9 to 16 and Comparative Examples 1 and 8 to 12, the amount of zinc stearate added, the amount of calcium stearate added and the amount of dipentaerythritol added, were changed variously, thereby preparing a vinyl chloride resin composition. The blended components and evaluation results of the obtained resin Glcomposition are shown in Table 5.

Example 28

The same procedures as defined in Example 16 were conducted except that the hydrotalcite-type particles obtained in Example 9 and additives were mixed with a vinyl chloride resin at the mixing ratio as shown below, thereby obtaining a kneaded sheet.

| Composition kneaded: | |
|---|---|
| Hydrotalcite-type particles | 3.5 parts by weight |
| Vinyl chloride resin (Degree of polymerization: 1,300, tradename: Kanebeer, produced by Kanegafuchi Kagaku Co., Ltd.) | 100 parts by weight |
| Diisononyl phthalate | 50 parts by weight |
| Zinc stearate (extra pure reagent) | 1.2 part by weight |
| Dibenzoylmethane | 0.2 part by weight |
| Diethyl phosphite (extra pure reagent) (anitioxidants) | 0.2 part by weight |
| Clay | 0 part by weight |
| Calcium carbonate (extra pure reagent) | 16 parts by weight |

Examples 29 to 33 and Comparative Example 20

The same procedures as defined in Example 28 were conducted except that the Mg—Al-based hydrotalcite-type particles obtained in Examples 9 and 10, the amount of zinc stearate added, the amount of clay added and the amount of calcium carbonate added, were changed variously, thereby preparing a vinyl chloride resin composition. The blended components and evaluation results of the obtained resin composition are shown in Table 6.

TABLE 1

| | | Production of Mg-Al-based hydrotalcite-type particles | | | | |
|---|---|---|---|---|---|---|
| Examples and Comparative Examples | Amount of reaction solution (liter) | Mg compound | | Al compound | | Concentration of $Na_2CO_3$ (mol/liter) | Concentration of NaOH (mol/liter) |
| | | Kind | Concentration (mol/liter) | Kind | Concentration (mol/liter) | | |

TABLE 1-continued

| | | | | | | | |
|---|---|---|---|---|---|---|---|
| Example 2 | 5.0 | MgSO$_4$ | 0.375 | Al$_2$(SO$_4$)$_3$ | 0.0625 | 0.0875 | 2.685 |
| Example 3 | 5.0 | MgSO$_4$ | 0.375 | Al$_2$(SO$_4$)$_3$ | 0.0625 | 0.0875 | 3.205 |
| Example 4 | 5.0 | MgSO$_4$ | 0.375 | Al$_2$(SO$_4$)$_3$ | 0.0625 | 0.0875 | 3.135 |
| Example 5 | 5.0 | MgSO$_4$ | 0.375 | Al$_2$(SO$_4$)$_3$ | 0.0625 | 0.0875 | 3.325 |
| Example 6 | 5.0 | MgSO$_4$ | 0.400 | Al$_2$(SO$_4$)$_3$ | 0.050 | 0.0700 | 3.185 |
| Example 7 | 5.0 | MgSO$_4$ | 0.250 | Al$_2$(SO$_4$)$_3$ | 0.125 | 0.1750 | 3.185 |
| Example 8 | 5.0 | MgCl$_2$ | 0.375 | AlCl$_3$ | 0.125 | 0.0875 | 3.185 |
| Comparative Example 1 | 5.0 | MgSO$_4$ | 0.375 | Al$_2$(SO$_4$)$_3$ | 0.0625 | 0.0875 | 3.185 |
| Comparative Example 2 | 5.0 | MgSO$_4$ | 0.375 | Al$_2$(SO$_4$)$_3$ | 0.0625 | 0.0875 | 3.125 |
| Comparative Example 3 | 5.0 | MgSO$_4$ | 0.375 | Al$_2$(SO$_4$)$_3$ | 0.0625 | 0.0875 | 3.130 |
| Comparative Example 4 | 5.0 | MgSO$_4$ | 0.375 | Al$_2$(SO$_4$)$_3$ | 0.0625 | 0.0875 | 3.355 |
| Comparative Example 5 | 5.0 | MgSO$_4$ | 0.375 | Al$_2$(SO$_4$)$_3$ | 0.0625 | 0.0875 | 3.185 |
| Comparative Example 6 | 5.0 | MgSO$_4$ | 0.375 | Al$_2$(SO$_4$)$_3$ | 0.0625 | 0.0875 | 1.285 |
| Comparative Example 7 | 5.0 | MgSO$_4$ | 0.375 | Al$_2$(SO$_4$)$_3$ | 0.0625 | 0.0875 | 3.125 |

| | Production of Mg—Al-based hydrotalcity-type particles | | | | |
|---|---|---|---|---|---|
| Examples and Comparative Examples | Amount of Ca added Ca/(Mg + Al) (molar ratio) | Concentration of Ca (mol/liter) | Addition method of Ca | Aging temperature (° C.) | pH value of suspension during aging (—) | Aging time (hr) |
| Example 2 | 0.06 | 0.03 | Charged after adding Mg and Al | 80 | 11.2 | 3 |
| Example 3 | 0.06 | 0.03 | Charged after adding Mg and Al | 95 | 12.3 | 18 |
| Example 4 | 0.02 | 0.01 | Charged after adding Mg and Al | 95 | 12.4 | 18 |
| Example 5 | 0.136 | 0.068 | Charged after adding Mg and Al | 95 | 12.0 | 18 |
| Example 6 | 0.06 | 0.03 | Charged after adding Mg and Al | 95 | 12.2 | 18 |
| Example 7 | 0.06 | 0.03 | Charged after adding Mg and Al | 95 | 11.9 | 18 |
| Example 8 | 0.06 | 0.03 | Charged simultaneously with addition of Mg and Al | 95 | 12.5 | 18 |
| Comparative Example 1 | 0.06 | 0.03 | Not charged | 95 | 12.3 | 18 |
| Comparative Example 2 | 0 | 0 | Charged after adding Mg and Al | 95 | 12.2 | 18 |
| Comparative Example 3 | 0.005 | 0.0025 | Charged after adding Mg and Al | 95 | 12.0 | 18 |
| Comparative Example 4 | 0.23 | 0.115 | Charged after adding Mg and Al | 95 | 12.3 | 18 |
| Comparative Example 5 | 0.06 | 0.03 | Charged after adding Mg and Al | 50 | 12.2 | 18 |
| Comparative Example 6 | 0.06 | 0.03 | Charged after adding Mg and Al | 95 | 8.8 | 18 |
| Comparative Example 7 | 0 | 0 | Not charged | 150 | 12.0 | 18 |

TABLE 2

| | Properties of Mg-Al-based hydrotalcite-type particles | | | | | | | | | | |
|---|---|---|---|---|---|---|---|---|---|---|---|
| Examples and Comparative Examples | Plate surface diameter ($\mu$m) | Thickness ($\mu$m) | Plate ratio (—) | Specific surface area (m$^2$/g) | Crystal structure | Composition: [Mg$_x$Ca$_y$]Al$_z$(OH)$_2$·A$^{n-}_{p}$·mH$_2$O | | | Ca content y/(x + z) | Al content z/(x + z) | Carbon content (wt. %) | Heat-resisting time of kneaded vinyl chloride sheet (hr) |
| | | | | | | x | y | z | | | | |
| Example 2 | 0.20 | 0.0337 | 5.9 | 38.6 | Hydrotalcite-type | 0.706 | 0.052 | 0.242 | 0.055 | 0.255 | 2.056 | 5 |

TABLE 2-continued

Properties of Mg-Al-based hydrotalcite-type particles

| Examples and Comparative Examples | Plate surface diameter (μm) | Thickness (μm) | Plate ratio (—) | Specific surface area (m²/g) | Crystal structure | Composition: $[Mg_xCa_y]Al_z(OH)_2 \cdot A^{n-}_{p} \cdot mH_2O$ x | y | z | Ca content y/(x + z) | Al content z/(x + z) | Carbon content (wt. %) | Heat-resisting time of kneaded vinyl chloride sheet (hr) |
|---|---|---|---|---|---|---|---|---|---|---|---|---|
| Example 3 | 0.80 | 0.0645 | 12.4 | 10.2 | Hydrotalcite-type | 0.702 | 0.058 | 0.240 | 0.062 | 0.255 | 2.155 | 6 |
| Example 4 | 0.25 | 0.0530 | 4.7 | 14.8 | Hydrotalcite-type | 0.740 | 0.020 | 0.240 | 0.020 | 0.245 | 2.011 | 5 |
| Example 5 | 0.21 | 0.0425 | 4.9 | 35.4 | Hydrotalcite-type | 0.658 | 0.120 | 0.222 | 0.136 | 0.252 | 2.168 | 5 |
| Example 6 | 0.23 | 0.0325 | 7.1 | 37.7 | Hydrotalcite-type | 0.755 | 0.056 | 0.189 | 0.059 | 0.200 | 2.003 | 6 |
| Example 7 | 0.22 | 0.0280 | 7.9 | 59.2 | Hydrotalcite-type | 0.470 | 0.056 | 0.474 | 0.059 | 0.502 | 2.111 | 5 |
| Example 8 | 0.41 | 0.0611 | 6.7 | 12.0 | Hydrotalcite-type | 0.708 | 0.055 | 0.237 | 0.058 | 0.251 | 2.002 | 5 |
| Comparative Example 1 | 0.08 | 0.0100 | 6.0 | 95.2 | Hydrotalcite-type | 0.708 | 0.054 | 0.238 | 0.057 | 0.252 | 2.122 | 3 |
| Comparative Example 2 | 0.07 | 0.0125 | 5.6 | 85.5 | Hydrotalcite-type | 0.745 | 0 | 0.255 | 0 | 0.255 | 2.148 | 2 |
| Comparative Example 3 | 0.05 | 0.0138 | 3.6 | 100.8 | Hydrotalcite-type | 0.742 | 0.005 | 0.253 | 0.005 | 0.254 | 2.024 | 3 |
| Comparative Example 4 | 0.09 | 0.0202 | 4.5 | 80.6 | Hydrotalcite-type | 0.612 | 0.185 | 0.203 | 0.227 | 0.249 | 2.185 | 3 |
| Comparative Example 5 | 0.07 | 0.0155 | 4.5 | 116.8 | Hydrotalcite-type | 0.708 | 0.054 | 0.238 | 0.057 | 0.252 | 2.047 | 2 |
| Comparative Example 6 | 0.06 | 0.0180 | 3.3 | 86.5 | Hydrotalcite-type | 0.708 | 0.054 | 0.238 | 0.057 | 0.252 | 2.088 | 2 |
| Comparative Example 7 | 0.40 | 0.0616 | 6.5 | 10.6 | Hydrotalcite-type | 0.752 | 0 | 0.248 | 0 | 0.248 | 2.155 | 3 |

TABLE 3

Production of Mg-Al-based hydrotalcite-type particles

| Examples and Comparative Examples | Amount of reaction solution (liter) | Mg compound Kind | Mg compound Concentration (mol/liter) | Al compound Kind | Al compound Concentration (mol/liter) | Concentration of $Na_2CO_3$ (mol/liter) | Concentration of NaOH (mol/liter) | Amount of Ca added Ca/(Mg + Al) (molar ratio) | Concentration of Ca (mol/liter) |
|---|---|---|---|---|---|---|---|---|---|
| Example 9 | 5.0 | $MgSO_4$ | 0.375 | $Al_2(SO_4)_3$ | 0.0625 | 0.0875 | 3.185 | 0.06 | 0.03 |
| Example 10 | 5.0 | $MgSO_4$ | 0.375 | $Al_2(SO_4)_3$ | 0.0625 | 0.0875 | 3.185 | 0.06 | 0.03 |
| Example 11 | 5.0 | $MgSO_4$ | 0.375 | $Al_2(SO_4)_3$ | 0.0625 | 0.0875 | 2.685 | 0.06 | 0.03 |
| Example 12 | 5.0 | $MgSO_4$ | 0.375 | $Al_2(SO_4)_3$ | 0.0625 | 0.0875 | 3.205 | 0.08 | 0.04 |
| Example 13 | 5.0 | $MgSO_4$ | 0.250 | $Al_2(SO_4)_3$ | 0.0625 | 0.0875 | 3.135 | 0.02 | 0.01 |
| Example 14 | 5.0 | $MgSO_4$ | 0.250 | $Al_2(SO_4)_3$ | 0.0625 | 0.0875 | 3.325 | 0.136 | 0.068 |
| Example 15 | 5.0 | $MgSO_4$ | 0.250 | $Al_2(SO_4)_3$ | 0.125 | 0.1750 | 3.185 | 0.06 | 0.03 |
| Comparative Example 8 | 5.0 | $MgSO_4$ | 0.375 | $Al_2(SO_4)_3$ | 0.0625 | 0.0875 | 3.130 | 0.005 | 0.0025 |
| Comparative Example 9 | 5.0 | $MgSO_4$ | 0.375 | $Al_2(SO_4)_3$ | 0.0625 | 0.0875 | 3.355 | 0.23 | 0.115 |
| Comparative Example 10 | 5.0 | $MgSO_4$ | 0.375 | $Al2(SO4)3$ | 0.0625 | 0.0875 | 3.185 | 0.06 | 0.03 |
| Comparative Example 11 | 5.0 | $MgSO_4$ | 0.375 | $Al2(SO4)3$ | 0.0625 | 0.0875 | 3.125 | 0 | 0 |

Production of Mg-Al-based hydrotalcite-type particles

| Examples and Comparative Examples | Addition method of Ca | Aging temperature (°C) | pH value of suspension during aging (—) | Aging time (hr) | Surface-treatment Kind | Amount added based on the weight of hydrotalcite-type particles (wt. %) |
|---|---|---|---|---|---|---|
| Example 9 | Charged after adding Mg and Al | 95 | 12.5 | 18 | Water glass #3/natural rosin | 3.0/3.0 |
| Example 10 | Charged after adding Mg and Al | 95 | 12.5 | 18 | Water glass #3/decyltrimethoxy silane | 3.0/0.5 |
| Example 11 | Charged after | 80 | 11.2 | 3 | Water glass #3/ | 3.0/1.5 |

TABLE 3-continued

| | | | | | | |
|---|---|---|---|---|---|---|
| Example 12 | Charged after adding Mg and Al | 95 | 12.3 | 18 | Water glass #3/natural rosin | 3.0/3.0 |
| Example 13 | Charged after adding Mg and Al | 95 | 12.4 | 18 | Water glass #3/natural rosin | 3.0/3.0 |
| Example 14 | Charged after adding Mg and Al | 95 | 12.0 | 18 | Water glass #3/ decyltrimethoxy silane | 3.0/1.5 |
| Example 15 | Charged after adding Mg and Al | 95 | 11.9 | 18 | Natural rosin | 5.0 |
| Comparative Example 8 | Charged after adding Mg and Al | 95 | 12.0 | 18 | Water glass #3/natural rosin | 3.0/6.0 |
| Comparative Example 9 | Charged after adding Mg and Al | 95 | 12.3 | 18 | Water glass #3/ decyltrimethoxy silane | 3.0/8.0 |
| Comparative Example 10 | Charged after adding Mg and Al | 50 | 12.2 | 18 | Water glass #3/Natural rosin | 3.0/6.0 |
| Comparative Example 11 | Not charged | 150 | 12.0 | 18 | Water glass #3/natural rosin | 3.0/3.0 |

TABLE 4

| | Properties of Mg-Al-based hydrotalcite-type particles | | | |
|---|---|---|---|---|
| Examples and Comparative Examples | Plate surface diameter ($\mu$m) | Thickness ($\mu$m) | Plate ratio (-) | Specific surface area (m2/g) |
| Example 9 | 0.40 | 0.0605 | 6.7 | 10.8 |
| Example 10 | 0.40 | 0.0605 | 6.7 | 11.1 |
| Example 11 | 0.20 | 0.0337 | 5.9 | 33.6 |
| Example 12 | 0.80 | 0.0645 | 12.4 | 10.1 |
| Example 13 | 0.25 | 0.0530 | 4.7 | 13.8 |
| Example 14 | 0.21 | 0.0425 | 4.9 | 32.8 |
| Example 15 | 0.22 | 0.0280 | 7.9 | 55.5 |
| Comparative Example 8 | 0.05 | 0.0138 | 3.6 | 93.5 |
| Comparative Example 9 | 0.09 | 0.0202 | 4.5 | 72.8 |
| Comparative Example 10 | 0.07 | 0.0155 | 4.5 | 109.1 |
| Comparative Example 11 | 0.40 | 0.0616 | 6.5 | 10.5 |
| Comparative Example 12 | 0.25 | 0.0610 | 4.1 | 9.2 |

| | Properties of Mg-Al-based hydrotalcite-type particles | | | |
|---|---|---|---|---|
| Examples and Comparative Examples | Crystal structure | Composition: [Mg$_x$Ca$_y$].Al$_z$.(OH)2.An-p.mH2O | | |
| | | x | y | z |
| Example 9 | Hydrotalcite-type | 0.709 | 0.055 | 0.236 |
| Example 10 | Hydrotalcite-type | 0.709 | 0.055 | 0.236 |
| Example 11 | Hydrotalcite-type | 0.706 | 0.052 | 0.242 |
| Example 12 | Hydrotalcite-type | 0.702 | 0.058 | 0.240 |
| Example 13 | Hydrotalcite-type | 0.740 | 0.020 | 0.240 |
| Example 14 | Hydrotalcite-type | 0.658 | 0.120 | 0.222 |
| Example 15 | Hydrotalcite-type | 0.470 | 0.056 | 0.474 |
| Comparative Example 8 | Hydrotalcite-type | 0.742 | 0.005 | 0.253 |
| Comparative Example 9 | Hydrotalcite-type | 0.612 | 0.185 | 0.203 |
| Comparative Example 10 | Hydrotalcite-type | 0.708 | 0.054 | 0.238 |
| Comparative Example 11 | Hydrotalcite-type | 0.752 | 0 | 0.248 |
| Comparative Example 12 | Hydrotalcite-type | 0.678 | 0 | 0.322 |

| | Properties of Mg-Al-based hydrotalcite-type particles | | | | |
|---|---|---|---|---|---|
| Examples and Comparative Examples | Ca content y/(x + z) | Al content z/(x + z) | Silicon content (calculated as SiO2) (wt. %) | Carbon content (wt. %) | Heat-resisting time of kneaded vinyl chloride sheet (hr) |
| Example 9 | 0.058 | 0.250 | 0.11 | 3.227 | 6 |
| Example 10 | 0.058 | 0.250 | 0.13 | 3.156 | 6 |
| Example 11 | 0.055 | 0.255 | 0.14 | 3.392 | 5 |
| Example 12 | 0.062 | 0.255 | 0.12 | 3.099 | 6 |
| Example 13 | 0.020 | 0.245 | 0.11 | 3.148 | 6 |
| Example 14 | 0.136 | 0.252 | 0.13 | 3.888 | 5 |
| Example 15 | 0.059 | 0.200 | — | 3.477 | 6 |
| Comparative Example 8 | 0.005 | 0.254 | 0.11 | 3.738 | 3 |
| Comparative Example 9 | 0.227 | 0.249 | 0.14 | 3.888 | 3 |
| Comparative Example 10 | 0.057 | 0.252 | 0.12 | 3.672 | 2 |
| Comparative Example 11 | 0 | 0.248 | 0.13 | 3.338 | 3 |
| Comparative Example 12 | 0 | 0.475 | 0.11 | 3.521 | 3 |

TABLE 5

| Examples and Comparative Examples | Kind of hydrotalcite-type particles | Composition (wt. part) | | |
|---|---|---|---|---|
| | | Vinyl chloride resin | Hydrotalcite-type particles | Zinc stearate |
| Example 16 | Example 1 | 100 | 4.6 | 0.8 |
| Example 17 | Example 9 | 100 | 4.6 | 0.8 |
| Example 18 | Example 10 | 100 | 4.6 | 0.8 |
| Example 19 | Example 11 | 100 | 4.6 | 0.8 |
| Example 20 | Example 12 | 100 | 4.6 | 0.8 |
| Example 21 | Example 13 | 100 | 4.6 | 0.8 |
| Example 22 | Example 14 | 100 | 4.6 | 0.8 |
| Example 23 | Example 15 | 100 | 4.6 | 0.8 |
| Example 24 | Example 10 | 100 | 4.6 | 2.0 |
| Example 25 | Example 9 | 100 | 4.6 | 0.5 |
| Example 26 | Example 10 | 100 | 4.6 | 1.2 |

TABLE 5-continued

| | | | | |
|---|---|---|---|---|
| Example 27 | Example 9 | 100 | 4.6 | 1.2 |
| Comparative Example 13 | Comparative Example 1 | 100 | 4.6 | 0.8 |
| Comparative Example 14 | Comparative Example 8 | 100 | 4.6 | 0.8 |
| Comparative Example 15 | Comparative Example 9 | 100 | 4.6 | 0.8 |
| Comparative Example 16 | Comparative Example 10 | 100 | 4.6 | 0.8 |
| Comparative Example 17 | Comparative Example 11 | 100 | 4.6 | 0.8 |
| Comparative Example 18 | Comparative Example 12 | 100 | 4.6 | 0.8 |
| Comparative Example 19 | Example 11 | 100 | 1.0 | 0.8 |

| Examples and Comparative Examples | Composition (wt. part) | |
|---|---|---|
| | Dipentaerythritol | Calcium stearate |
| Example 16 | 0.2 | 0.1 |
| Example 17 | 0 | 0.1 |
| Example 18 | 0.2 | 0.1 |
| Example 19 | 0.4 | 0 |
| Example 20 | 0 | 0 |
| Example 21 | 0 | 0.1 |
| Example 22 | 0.2 | 0 |
| Example 23 | 0.4 | 0.1 |
| Example 24 | 0 | 0 |
| Example 25 | 0 | 0.1 |
| Example 26 | 0 | 0 |
| Example 27 | 0 | 0 |
| Comparative Example 13 | 0.2 | 0.1 |
| Comparative Example 14 | 0.4 | 0.1 |
| Comparative Example 15 | 0.2 | 0 |
| Comparative Example 16 | 0.4 | 0.1 |
| Comparative Example 17 | 0 | 0 |
| Comparative Example 18 | 0 | 0 |
| Comparative Example 19 | 0 | 0 |

| Examples and Comparative Examples | Evaluation results | | |
|---|---|---|---|
| | Heat stability (min.) | Coloring property | Volume resistivity ($\times 10^{13}$ $\Omega \cdot$cm) |
| Example 16 | 511 | A | 12.8 |
| Example 17 | 601 | A | 45.5 |
| Example 18 | 588 | A | 30.5 |
| Example 19 | 469 | A | 16.1 |
| Example 20 | 590 | A | 24.8 |
| Example 21 | 599 | A | 28.3 |
| Example 22 | 522 | A | 18.1 |
| Example 23 | 432 | A | 13.2 |
| Example 24 | 956 | A | 22.2 |
| Example 25 | 519 | A | 38.8 |
| Example 26 | 700 | A | 25.5 |
| Example 27 | 862 | A | 30.8 |
| Comparative Example 13 | 165 | C | 1.9 |
| Comparative Example 14 | 132 | D | 2.4 |
| Comparative Example 15 | 170 | C | 2.3 |
| Comparative Example 16 | 112 | D | 1.8 |
| Comparative Bxample 17 | 250 | B | 2.8 |
| Comparative | 214 | C | 2.4 |
| Example 18 | | | |
| Comparative Example 19 | 82 | C | 1.8 |

TABLE 6

| Examples and Comparative Examples | Kind of hydrotalcite-type particles | Composition (wt. part) | | |
|---|---|---|---|---|
| | | Vinyl chloride resin | Hydrotalcite-type particles | Zinc stearate |
| Example 28 | Example 9 | 100 | 3.5 | 1.2 |
| Example 29 | Example 9 | 100 | 3.5 | 1.4 |
| Example 30 | Example 10 | 100 | 3.5 | 2.0 |
| Example 31 | Example 9 | 100 | 3.5 | 0.8 |
| Example 32 | Example 9 | 100 | 3.5 | 1.0 |
| Example 33 | Example 10 | 100 | 3.5 | 1.2 |
| Comparative Example 20 | Example 9 | 100 | 1.0 | 0.8 |

| Examples and Comparative Examples | Blended components | |
|---|---|---|
| | Clay | $CaCO_3$ |
| Example 28 | 0 | 16 |
| Example 29 | 0 | 16 |
| Example 30 | 0 | 16 |
| Example 31 | 10 | 20 |
| Example 32 | 10 | 20 |
| Example 33 | 10 | 20 |
| Comparative Example 20 | 0 | 16 |

| Examples and Comparative Examples | Evaluation results | | |
|---|---|---|---|
| | Heat stability (min.) | Coloring property | Volume resistivity ($\times 10^{13}$ $\Omega \cdot$cm) |
| Example 28 | 420 | A | 18.2 |
| Example 29 | 603 | A | 25.1 |
| Example 30 | 707 | A | 20.1 |
| Example 31 | 759 | A | 33.3 |
| Example 32 | 821 | A | 40.5 |
| Example 33 | 719 | A | 36.6 |
| Comparative Example 20 | 116 | C | 2.6 |

What is claimed is:

1. Plate-shaped Mg—Al-based hydrotalcite particles having a composition represented by the formula:

$$[Mg_xCa_y] \cdot Al_z \cdot (OH)_2 \cdot A^{n-}{}_p \cdot mH_2O$$

wherein $0.2 \leq z/(x+z) \leq 0.6$; $0.01 \leq y/(x+z) \leq 0.20$; $x+y+z=1$; y is 0.020 to 0.058; $p=(2(x+y-1)+3z)/n$; A is an n-valent anion; and m is more than 0 and not more than 0.75, having a plate surface diameter of 0.1 to 1.0 μm, a thickness of 0.02 to 0.08 μm and a plate ratio (plate surface diameter/thickness) of 2:1 to 15:1, the particles showing a heat-resisting time of not less than 4 hours when measured by the following method:

(1) mixing the hydrotalcite particles together with additives in a vinyl chloride resin in the following mixing ratio:

Composition of mixture:

hydrotalcite particles  3 parts by weight
vinyl chloride resin (degree of polymerization:  100 parts by weight -continued 1300)
| | |
|---|---|
| diethylhexyl phthalate | 50 parts by weight |
| calcium stearate | 2 parts by weight |
| zinc stearate | 0.4 part by weight |
| 1,3-diphenyl-1,3-propane-dione | 0.2 part by weight |
| diethyl phosphite | 0.5 part by weight | then kneading 50 g of the obtained mixture at 155° C. for 3 minutes using hot rolls whose gap is set to 0.75 mm, to produce a kneaded sheet;

(2) pressure treating the obtained kneaded sheet using a hot press to produce a sheet piece having a thickness of 1.5 mm, the pressing conditions being: press temperature: 160° C.; press pressure: 100 kg/cm$^2$; press time: 1 minute; press gap: 1.5 mm; and amount treated: 35 g; and (3) placing the obtained sheet piece (20 mm×20 mm) in an oven and allowing it to stand in air at 180° C., wherein the time required until the sheet piece is discolored black is the heat-resisting time.

2. Mg—Al-based hydrotalcite particles according to claim 1, wherein said anion $A^{n-}$ is selected from the group consisting of a hydroxy ion (OH$^-$), a carbonate ion (CO$_3^{2-}$) and a sulfate ion (SO$_4^{2-}$).

3. Mg—Al-based hydrotalcite particles according to claim 1, wherein x is 0.658 to 0.755.

* * * * *